US012253187B2

(12) United States Patent
Rios Fernandez et al.

(10) Patent No.: US 12,253,187 B2
(45) Date of Patent: Mar. 18, 2025

(54) CRYOGENIC REGULATING VALVE FOR AIRCRAFT OR SPACECRAFT

(71) Applicant: ARIANEGROUP SAS, Les Mureaux (FR)

(72) Inventors: Sonia Rios Fernandez, Vernon (FR); Yoann Lavenu, Vernon (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/557,889

(22) PCT Filed: Apr. 6, 2022

(86) PCT No.: PCT/FR2022/050641
§ 371 (c)(1),
(2) Date: Oct. 27, 2023

(87) PCT Pub. No.: WO2022/229535
PCT Pub. Date: Nov. 3, 2022

(65) Prior Publication Data

US 2024/0247734 A1 Jul. 25, 2024

(30) Foreign Application Priority Data

Apr. 28, 2021 (FR) ....................................... 2104452

(51) Int. Cl.
*F16K 31/54* (2006.01)
*F16K 3/26* (2006.01)
(Continued)

(52) U.S. Cl.
CPC .............. *F16K 31/54* (2013.01); *F16K 3/265* (2013.01); *F16K 3/316* (2013.01); *F16K 3/3165* (2013.01); *F16K 3/34* (2013.01)

(58) Field of Classification Search
CPC .......... F16K 31/54; F16K 3/265; F16K 3/316; F16K 3/3165; F16K 3/34
(Continued)

(56) References Cited

U.S. PATENT DOCUMENTS 3,035,808 A * 5/1962 Knox ...................... F16K 31/16 137/496
10,557,562 B2 * 2/2020 Sattelberg ............... F16K 31/53
(Continued)

FOREIGN PATENT DOCUMENTS

EP 0846237 B1 7/2003
EP 3309436 B1 4/2020

OTHER PUBLICATIONS

Search Report and Written Opinion issued in International Application No. PCT/FR2022/050641, mailed Jul. 19, 2022.
(Continued)

*Primary Examiner* — John Bastianelli
(74) *Attorney, Agent, or Firm* — Bookoff McAndrews, PLLC

(57) ABSTRACT

Regulating valve with a rack and pinion transmission system for an aircraft or a spacecraft, including a valve body, a transmission shaft, a rolling element, a rack of the rolling element being engaged with a pinion of the shaft, a first end of the rolling element being guided in translation by a first bearing, and a second end of the rolling element being guided in translation by a second bearing, the valve including an annular connecting flange fixed to the valve body, the annular connecting flange radially extending between an axisymmetric inner face about a second axis of the rolling element and an axisymmetric outer face about a central axis, the inner face including a radially inner housing in which the second bearing is housed, the second axis being radially offset with respect to the central axis.

10 Claims, 4 Drawing Sheets

(51) Int. Cl.
*F16K 3/316* (2006.01)
*F16K 3/34* (2006.01)

(58) Field of Classification Search
USPC .................................................... 251/58, 250
See application file for complete search history.

(56) References Cited

U.S. PATENT DOCUMENTS

2014/0054477 A1 2/2014 Schade et al.
2018/0066759 A1* 3/2018 Case ...................... B63C 11/22

OTHER PUBLICATIONS

Search Report issued in French Application No. 21 04452, issued Dec. 7, 2021.

* cited by examiner

[Fig. 1]
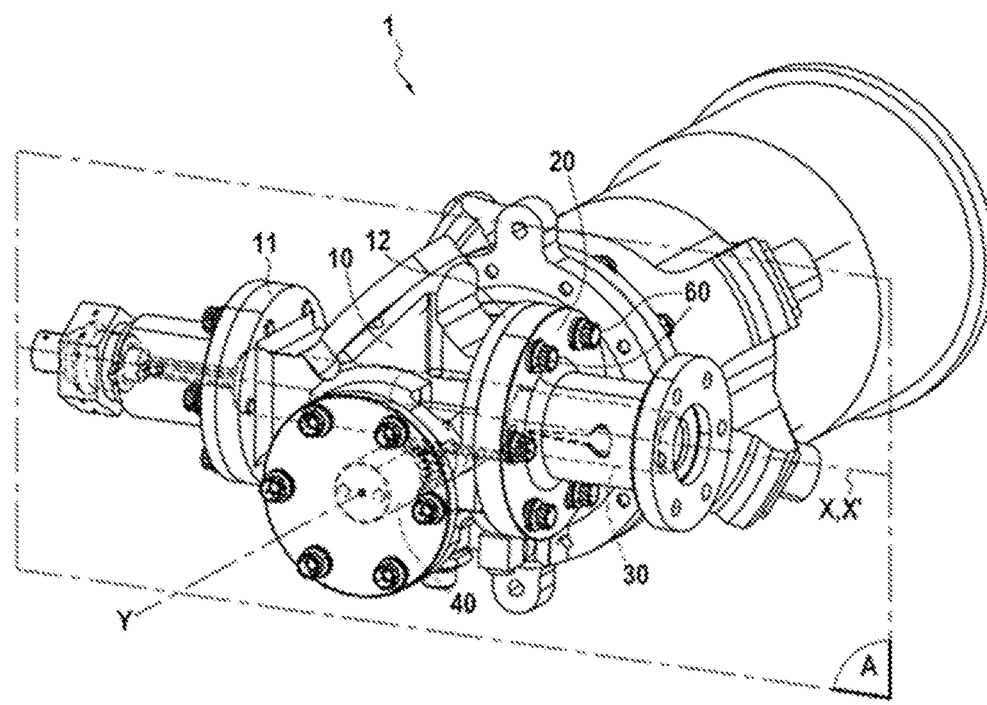

[Fig. 2]
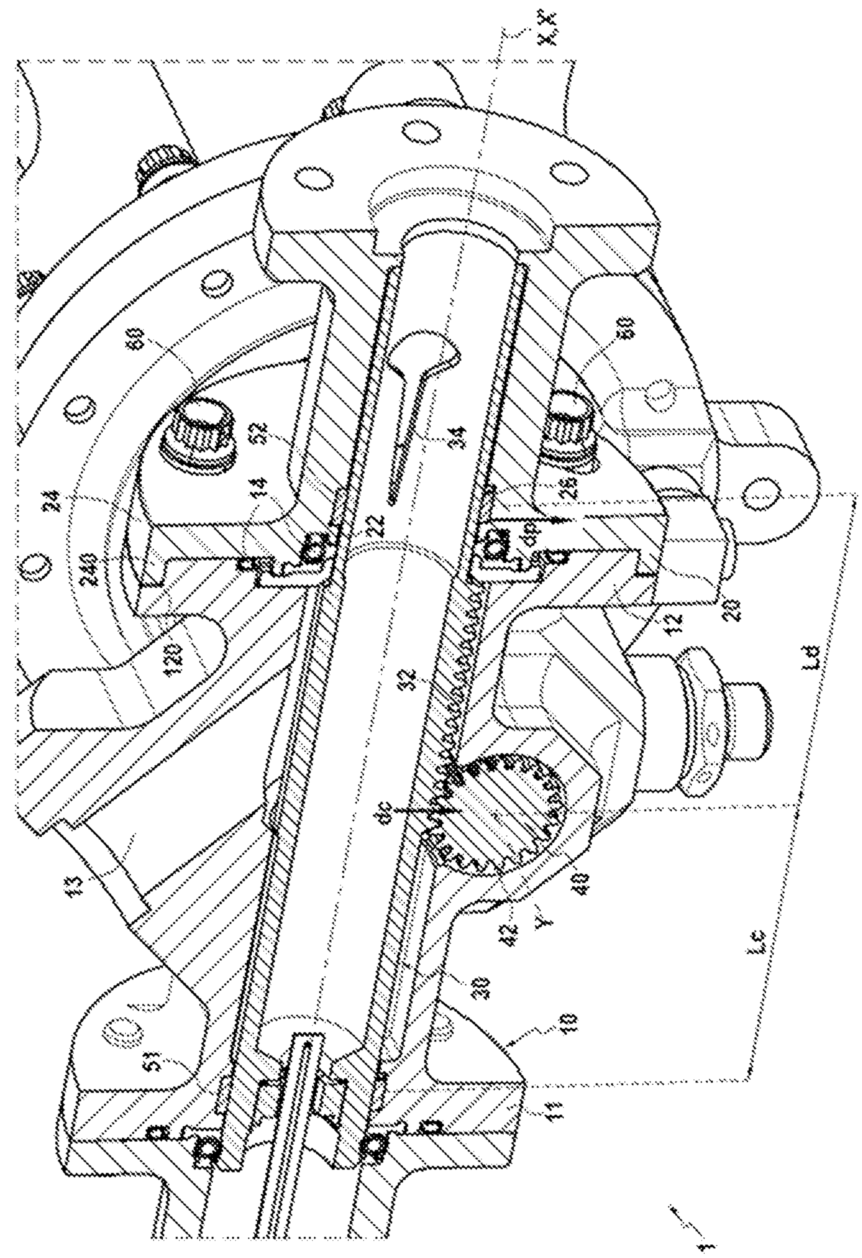

[Fig. 3A-3B]
[Fig. 3A]
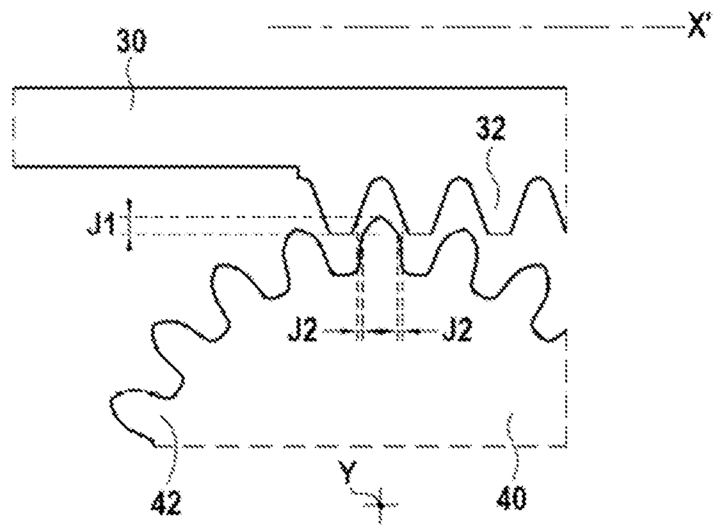
[Fig. 3B]
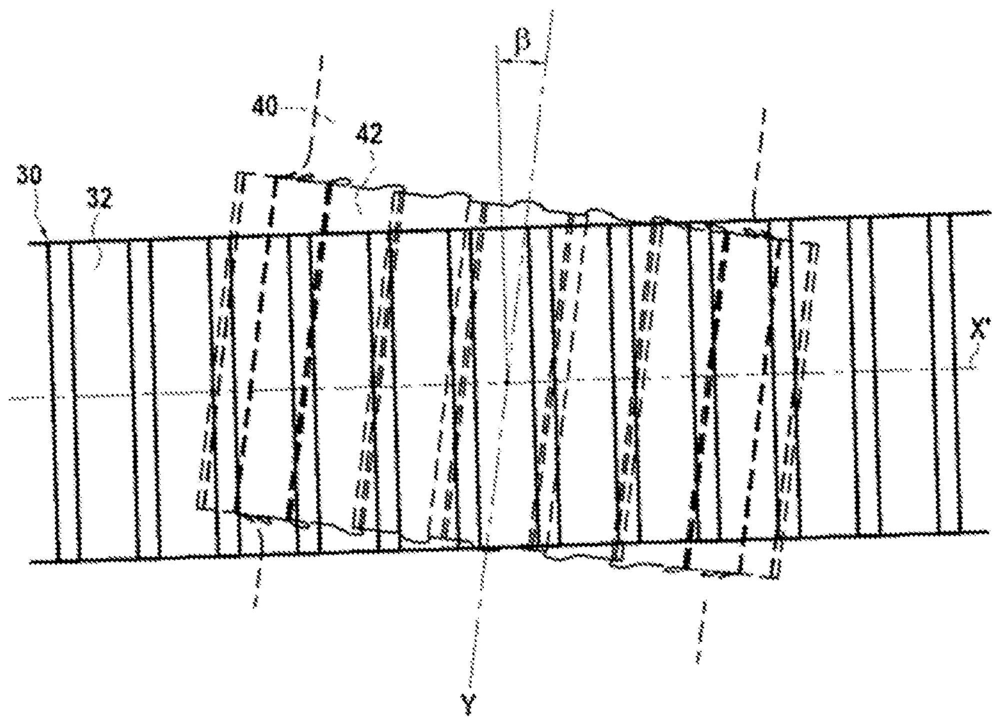

[Fig. 4]
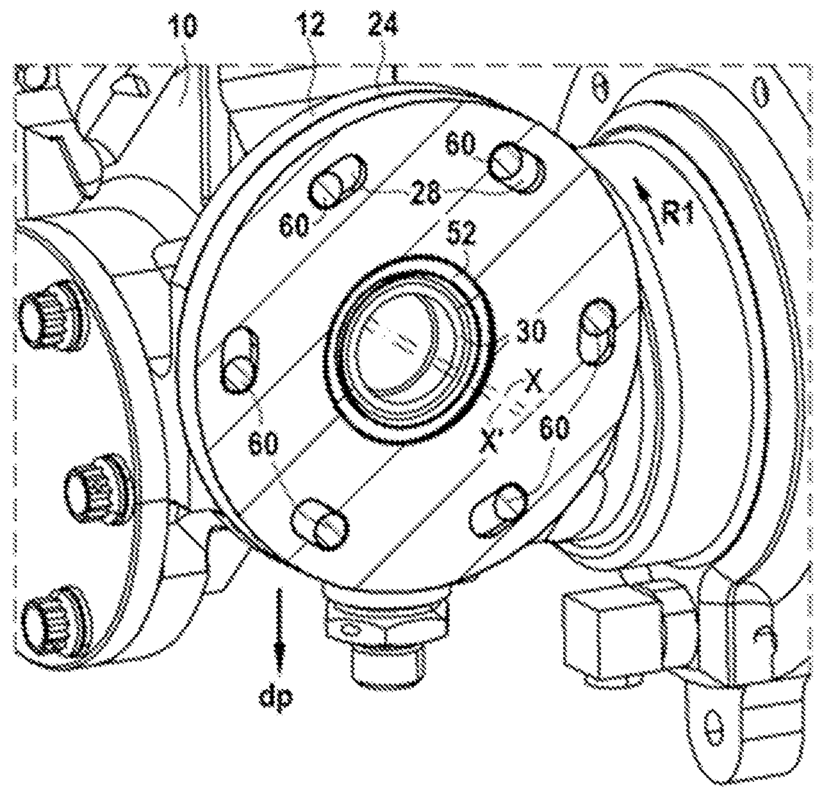
[Fig. 5]
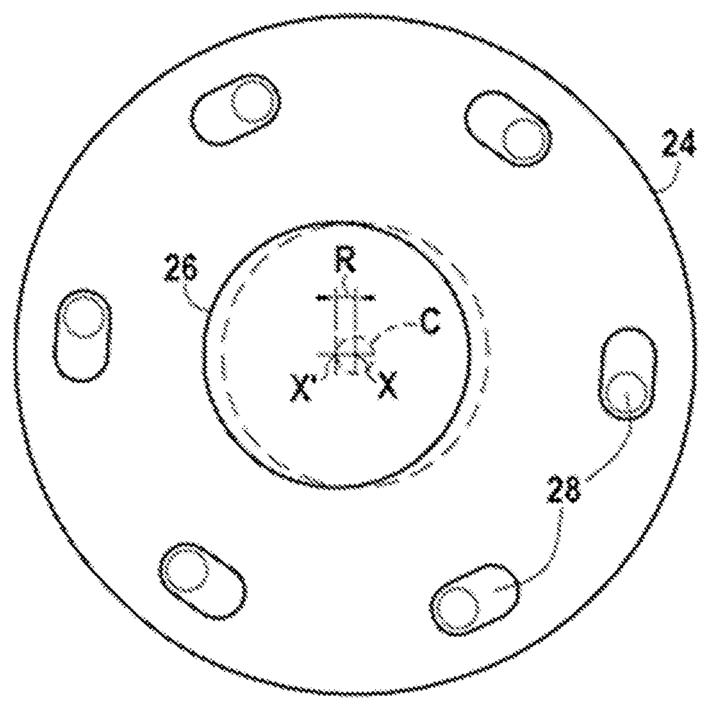

CRYOGENIC REGULATING VALVE FOR AIRCRAFT OR SPACECRAFT

CROSS-REFERENCE TO RELATED APPLICATIONS

This is a National Stage Application under 35 U.S.C. § 371 of International Application No. PCT/FR2022/050641, filed Apr. 6, 2022, now published as WO 2022/229535 A1, which claims priority to French Patent Application No. 2104452, filed on Apr. 28, 2021.

TECHNICAL FIELD

The present disclosure relates to the field of aircrafts and spacecrafts, and in particular of engines fitted to this type of machines, for example rocket engines. The present disclosure particularly relates to a cryogenic regulating valve with a rack and pinion transmission system for an aircraft or a spacecraft, an engine of an aircraft or a spacecraft comprising such a valve, and a setting method using such a valve.

PRIOR ART

In the context of studies of the cryogenic regulating valves for engines of aircrafts or spacecrafts, for example for rocket engines, the requirements in terms of resolution, that is to say in terms of accuracy, are important criteria in the design of this equipment. They indeed make it possible to regulate the operating points of the engine (thrust and mixture ratio), and to minimize the actuation torques. This need for accurate regulation of the operating points exists for rocket engines, but also for other types of cryogenic fluid propulsion systems, for example for an airplane or a satellite.

Consequently, suitable solutions are necessary to best limit the impact of the functional clearances in the concerned mechanisms, which may interfere with the accuracy of the valves, in particular in the rack and pinion transmission system of these regulating valves. These mechanisms must be optimized so as not to generate high actuation torques.

The field of application of these valves, in terms of temperatures, can be very wide, being able to start at 20 K or less depending on the nature of the cryogenic fluid, and reach high temperatures.

These high temperature variations, which can reach differentials of several hundreds of Kelvin, generate differential contractions/expansions in the different materials constituting the mechanism, and thus increase the risks of changes in the clearances in the latter.

It is therefore necessary to take care to reduce the initial clearance as much as possible by setting it during the mounting, and to ensure that the contractions or expansions of the different materials do not disturb the operation of the valve, for example if these contractions or expansions lead to a tightening of the transmission system, blocking its movements, or on the contrary to excessive clearances, directly interfering with the accuracy of the valve.

The mechanism of the regulating valve with a rack and pinion transmission system comprises a rolling element including the rack, and being actuated by a transmission shaft including a pinion. The transmission shaft is guided in rotation by pivot functions (for example bearings or rollers) and the rolling element is guided in translation by slide functions (for example bearings). These different functions include adjusted operating clearances strictly greater than zero to the minimum, whose maximums are dependent on the accuracy of production of the different concerned parts as well as on the temperatures of use (contraction/expansion of the parts). This implies certain dispersion on the positioning and the perpendicularity of the axes between the shaft and the rolling element which must be taken into account at the level of the associated rack and pinion connection. A functional clearance at the level of this connection must therefore be identified. The variation of this clearance is directly impacted by the dimensional and position dispersions of the different pivots/slides functions and associated previous parts, by imperatively meeting a clearance strictly greater than zero to avoid any hyperstaticity, while making ensuring a linear contact on the teeth of the gear connection in operation favorable to hertz pressure for example, and this regardless of the temperature of use. This can lead to quite large maximum rack and pinion clearances (represented by J1 and J2 in FIG. 3A) depending on the dimensional configuration of the parts, and interfere with the accuracy in the setting of the maneuver of the valve (resolution of the valve on the flow sections).

There is therefore a need to overcome at least some of the drawbacks mentioned above.

DISCLOSURE OF THE INVENTION

The present disclosure relates to a regulating valve with a rack and pinion transmission system for an aircraft or a spacecraft, comprising:

- a valve body,
- a transmission shaft disposed at least partly in the valve body, movable in rotation about a first axis, and including a pinion,
- a rolling element disposed at least partly in the valve body, movable in translation along a second axis substantially perpendicular to the first axis, and including a rack, the rack being engaged with the pinion so that a rotation of the transmission shaft causes a translation of the rolling element, a first end of the rolling element being guided in translation by a first fixed bearing, and a second end of the rolling element being guided in translation by a second bearing,
- an annular connecting flange fixed to the valve body by means of fixing means, the annular connecting flange radially extending between an axisymmetric inner face about the second axis and an axisymmetric outer face about a central axis, the inner face comprising a radially inner housing in which the second bearing is housed, the second axis being radially offset with respect to the central axis.

In the present disclosure, the terms “radially”, “inner”, “outer” and their derivatives refer to the radial direction, that is to say the direction perpendicular to the central axis of the annular connecting flange.

The radially inner housing may be a circumferential groove made on the inner face of the annular connecting flange. The second bearing may be a sleeve housed in this housing, surrounding the second end of the rolling element while being in contact therewith.

According to a front view, that is to say a view parallel to the central axis of the outer face of the flange, the outer face of the annular connecting flange defines an outer circle, the central axis of the outer face passing through the center of this outer circle. Likewise, the inner face of the flange, comprising the housing, defines an inner circle. The axis of the housing, that is to say the second axis, passes through the center of this inner circle, the inner and outer circles not being concentric.

Given the fact that the axis of the radially inner housing, that is to say the second axis, is radially offset with respect to the central axis of the outer face of the flange, also called main axis of the flange, a rotation of the latter about its main axis therefore causes a displacement of the axis of the radially inner housing according to a circle, the radius of this circle being equal to the value of the offset between its two axes.

Consequently, while the first bearing is held in a fixed position, a rotation of the annular connecting flange about its central (or main) axis causes a vertical displacement of the second bearing. This vertical displacement of the second bearing makes it possible to drive the second end of the rolling element upwards or downwards, depending on the direction of rotation of the flange, thus making it possible to move the rack closer to or away from the pinion of the transmission shaft.

In other words, the annular connecting flange is a setting flange, making it possible to set the height of the second end of the rolling element. Particularly, it is possible, by rotating the annular connecting flange about its central or main axis to bring the rack into contact with the pinion. More specifically, it is possible to bring the teeth of the rack to come into contact with the bottom of the slots existing between two teeth of the pinion.

This position of contact between the rack and the pinion thus serves as a reference position, from which it is possible to accurately set the position of the rack relative to the pinion. More specifically, by rotating the flange in the opposite direction, causing the rack to move away from the pinion, from this reference position, it is possible to accurately set a minimum clearance necessary for the operation of the mechanism, depending on the field of thermal use concerned by the valve, without generating too large clearances that could limit the accuracy of setting of the valve, and while making it possible to ensure a linear contact of the gear connection favorable to the Hertz pressure for example. This device therefore allows accurate setting of the functional clearances, making it possible to improve the accuracy of the valve and its robustness.

In some embodiments, the annular connecting flange is fixed to an annular flange of the valve body, the central axis of the outer face of the annular connecting flange and a central axis of the annular flange of the valve body being concentric, when the annular connecting flange is fixed to the annular flange of the valve body.

The annular connecting flange is thus centered relative to the flange of the valve body. A rotation of the annular connecting flange on itself, that is to say about its main axis, also corresponding to the central axis of the flange of the valve body, causes a displacement of the second bearing relative to the valve body identical to its displacement relative to the annular connecting flange. This improves the accuracy of adjustment of the clearances between the rack and the pinion.

In some embodiments, the annular flange of the valve body comprises, along its outer circumference, a centering shoulder, and the annular connecting flange comprises a circumferential shoulder having a shape complementary to the centering shoulder of the annular flange of the valve body, and being configured to interlock with said centering shoulder when the annular connecting flange is fixed to the annular flange of the valve body.

In other words, the respective shoulders of the flange of the valve body and of the annular connecting flange are configured to engage each other, so as to limit the relative displacements between these two flanges along a plane perpendicular to the central axis of the flanges. Particularly, when the two flanges are interlocked with each other, only a rotation of the annular connecting flange about its central axis, relative to the flange of the valve body, is possible. It is thus possible to rotate the annular connecting flange about its central axis, while maintaining the centering of the latter relative to the flange of the valve body. This further improves the accuracy of adjustment of the clearances between the rack and the pinion.

In some embodiments, when the annular connecting flange is fixed to the annular flange of the valve body, the centering shoulder and the circumferential shoulder are axisymmetric about the central axis of the outer face of the annular connecting flange.

This configuration facilitates the rotation of the annular connecting flange about its main axis. Indeed, during this rotation, a relative sliding between the respective shoulders of the two flanges occurs. In other words, the respective shoulders thus serve as a guide in rotation of the annular connecting flange relative to the annular flange of the valve body.

In some embodiments, the annular connecting flange comprises oblong orifices circumferentially distributed about the central axis of the outer face of said flange, and configured to receive means for fixing the annular connecting flange to the annular flange of the valve body.

The oblong orifices extend along a circumferential direction, about the main axis of the annular connecting flange. This configuration facilitates the process of setting the functional clearances. Indeed, the presence of these oblong orifices allows freedom of rotational movement of the annular connecting flange about its central axis. By loosening the fixing means, it is thus possible to rotate the annular connecting flange about its central axis in an counterclockwise direction (for example), until one end of each oblong orifice comes into abutment against a fixing means, and then to rotate the annular connecting flange about its central axis in the clockwise direction, until the other end of each oblong orifice comes into abutment against the fixing means. The presence of these oblong orifices thus offers a possible amount of rotation for the annular connecting flange, and makes it possible to best adjust the desired functional clearances between the rack and the pinion. When the desired position is reached, the fixing means can be tightened again to immobilize the annular connecting flange against the valve body.

In some embodiments, along a radial direction perpendicular to the central axis of the outer face of the annular connecting flange, a distance between the central axis of said outer face and the second axis is less than 6 mm, preferably less than 4 mm, more preferably less than 2 mm.

Preferably, the central axis and the second axis are initially offset relative to each other, prior to the height setting of the second end of the rolling element, parallel to the first axis. These offset values between the central axis, that is to say the main axis of the annular connecting flange and the second axis, that is to say the axis of the annular housing, make it possible to adjust the sensitivity of setting of the desired functional clearance between the rack and the pinion, directly dependent on the angle of rotation (by considering by approximation the vertical displacement as the opposite side of the tangent of this angle and the radial offset as the adjacent side). The sensitivity of setting is all the more precise as the external diameter of the annular flange is large, to which are added the distance between the first and second bearings more or less spaced from each other, and the position of the gear connection more or less centered between these bearings, which provide additional fineness of setting proportional to the displacement of the second bearing. Furthermore, a too small offset would not allow the rack to come into contact with the pinion of the transmission shaft, and a great offset would harm the sensitivity of setting and therefore the overall operation of the valve.

In some embodiments, the valve is a cryogenic regulating valve.

The present disclosure also relates to an engine of an aircraft or a spacecraft comprising a regulating valve according to any one of the preceding embodiments.

In some embodiments, the engine of an aircraft or a spacecraft is a rocket engine.

The present disclosure also relates to a setting method using the regulating valve according to any one of the preceding embodiments, comprising steps of:

- rotating the connecting flange in the counter-clockwise direction about its central axis until bringing the rack into contact with the pinion,
- rotating the connecting flange in the clockwise direction about its central axis by a predetermined angular value,
- tightening the annular connecting flange against the flange of the valve body via the fixing means.

Preferably, before the rotation of the connecting flange in the counter-clockwise direction, the central axis and the second axis are initially offset relative to each other parallel to the first axis. More generally, the different rotations of the connecting flange in the clockwise or counter-clockwise direction, allowing the height setting of the second end of the rolling element, are made around a position in which the central axis and the second axis are offset relative to each other substantially parallel to the first axis.

BRIEF DESCRIPTION OF THE DRAWINGS

The invention and its advantages will be better understood upon reading the detailed description given below of various embodiments of the invention given by way of non-limiting examples. This description refers to the pages of appended figures, on which:

FIG. 1 is a perspective overview of a cryogenic regulating valve according to the present disclosure, FIG. 2 is a detailed and sectional view of the valve of FIG. 1, along the cutting plane A, FIGS. 3A and 3B are respectively front and top detailed views representing the functional clearances of the connection between the rack and the pinion, FIG. 4 is a detailed sectional view of the valve of FIG. 1, along a cutting plane perpendicular to plane A and comprising the annular connecting flange, FIG. 5 schematically represents a section of the annular connecting flange perpendicular to the main axis of this flange.

DESCRIPTION OF THE EMBODIMENTS

One embodiment of a regulating valve 1 according to the present disclosure will be described with reference to FIGS. 1 to 5.

The cryogenic regulating valve 1 comprises a valve body 10, inside which are disposed a transmission shaft 40 extending along a first axis Y, and a rolling element 30 extending along a second axis X', substantially perpendicular to the axis Y. By substantially perpendicular, it is understood that the two axes are perpendicular, with the functional clearances existing between these two parts, as well as the residual movements between these two parts during the relative displacement of one relative to the other.

The transmission shaft 40 comprises a pinion 42, and is configured to rotate about the first axis Y, being driven by a motor (not represented). The rolling element 30 comprises, in its lower part, a rack 32, the teeth of the latter being engaged with the teeth of the pinion 42 of the transmission shaft 40. Thus, a rotation of the transmission shaft 40 about its axis Y causes a translation of the rolling element 30 along the second axis X'.

The cryogenic regulating valve 1 also comprises an annular connecting flange 20 fixed to the valve body 10. The annular connecting flange 20 makes it possible to make the connection between the valve body 10 and another element of the aircraft (not illustrated). In the position illustrated in FIG. 2, one end of the rolling element 30, comprising a window 34, is disposed in the connecting flange 20. Thus, a fluid flowing in a channel 13 of the valve body 10 cannot flow inside the rolling element 30, and therefore cannot reach the other element of the aircraft. Seals 14 are also provided at the level of the connection between the annular connecting flange 20 and the valve body 10, to limit leakage of the fluid.

From the position illustrated in FIG. 2, when the transmission shaft 40 rotates in the counter-clockwise direction, the rolling element 30 is driven in translation in a right-left direction (according to the orientation of FIG. 2), until the window 34 is in fluid communication with the channel 13. The fluid present in the latter can then flow inside the rolling element 30, and flow up to the element of the aircraft to which the connecting flange 20 is fixed.

Furthermore, the rolling element 30 is guided in translation, along the second axis X', by a first bearing 51, disposed in a first flange 11 of the valve body 10, and by a second bearing 52, disposed in the annular connecting flange 20. The bearings 51 and 52 can be annular sleeves comprising a material having a low coefficient of friction (for example polytetrafluoroethylene, called "PTFE").

These different bearings may be responsible for certain dispersion on the positioning and perpendicularity of the axes between the shaft and the rolling element, having an impact on the associated rack and pinion connection. Particularly, the variation of the clearances at the level of this connection is directly impacted by these different positions of pivots/slides functions. FIGS. 3A and 3B represent these different clearances J1 and J2. FIG. 3A is a front view, that is to say a view parallel to the first axis of rotation Y of the pinion 42, of the connection between this pinion 42 and the rack 32. FIG. 3B is a top view of FIG. 3A, that is to say a view perpendicular to the axis Y. J1 represents a vertical clearance, that is to say an existing spacing between the teeth of the pinion 42 and those of the rack 32 along a direction perpendicular to the axis Y and to the axis X'. J2 represents a lateral clearance, that is to say an existing spacing between the teeth of the pinion 42 and those of the rack 32 along the axis X'. An angle β greater than or less than 90° between the axis Y of the shaft 40 and the axis X' of the rolling element can also be generated (cf. FIG. 3B) by the position of its different pivots and slides functions.

The device described below makes it possible to control these clearances, while ensuring a preferable linear contact at the level of the teeth of the gear connection.

The annular connecting flange 20 extends radially between a radially inner face, hereinafter "inner face 22" and a radially outer face, hereinafter "outer face 24". It is fixed to a second flange 12 of the valve body 10, by means of fixing means, particularly bolted connections 60. The second flange 12 of the valve body 10 comprises, along its radially outer circumference, a shoulder 120. The annular connecting flange 20 also comprises, along its radially outer circumference, a shoulder 240, having a shape complementary to that of the shoulder 120, allowing the annular connecting flange 20 to interlock with, in other words, fit into, the second flange 12 of the valve body 10.

The orifices of the connecting flange 20, through which the bolted connections 60 making it possible to fix the connecting flange 20 to the second flange 12 of the valve body 10 pass, are oblong orifices 28. The main axis of these oblong orifices 28 extend in the circumferential direction, about the central axis X of the outer face 24.

The outer face 24 and the second flange 12 are concentric, and extend about a central axis X, corresponding to the main axis of the annular connecting flange 20. The inner face 22 of the connecting flange 20 comprises an annular housing in which the second bearing 52 is housed. The annular housing is an annular groove 26 extending along the radially inner circumference of the inner face 22, about an axis corresponding to the second axis X4, along which the rolling element 30 translates.

The axes X and X' are not coaxial, but are radially offset relative to each other parallel to the first axis Y initially. The inner and outer faces of the connecting flange 20 are therefore eccentric relative to each other. The large circle in dashed lines in FIG. 5 represents the theoretical position of the inner face 22 if these axes were not offset. In other words, the end of the rolling element 30 disposed in the connecting flange 20 and housed inside the inner face 22 while being guided by the second bearing 52, is eccentric relative to the outer face 24. The central axis X of the outer face 24 of the flange 20 and the second axis X' can be radially offset by a distance R of less than 6 mm, preferably less than 4 mm, even more preferably less than 2 mm.

Thus, a rotation of the connecting flange 20 about the central axis X causes a displacement of the second axis X', therefore of the groove 26, and thus of the second bearing 52, about the central axis X, according to a circular trajectory C of radius R. Consequently, the rotation of the connecting flange 20 about the central axis X causes a downward displacement dp of the second bearing 52 (according to the reference frame of FIGS. 2 and 4), and therefore a displacement dc of the rolling element 30 at the level of the rack and pinion connection of a few tenths or even hundredths of a millimeter, illustrated by the arrow in FIG. 2.

The displacement dp of the bearing causes a displacement dc of the rack according to the formula $dc=dp \times Lc/(Lc+Ld)$, where Lc is the distance between the first bearing 51 and the center of the pinion 42, and Ld is the distance between the second bearing 52 and the center of the pinion 42, along the second axis X'.

A method for setting the functional clearances J1, J2 will be described in the remainder of the description, with reference to FIGS. 4 and 6.

From an initial position of the connecting flange 20 about the central axis X, for example the position illustrated in FIG. 4, a rotation of the connecting flange 20 in the direction R1 illustrated in FIG. 4, corresponding to the counter-clockwise direction, is performed about the central axis X (step S1). This rotation is made possible by the oblong shape of the orifices 28, thus being able to move relative to the bolted connections 60, in the circumferential direction.

The rotation is stopped when the teeth of the rack 32 come into abutment at the bottom of the interstices between the teeth of the pinion 42, so that a rotation in the direction R1 is no longer possible (step S2).

From this position, a rotation of the connecting flange 20 in the opposite direction to the direction R1, corresponding to the clockwise direction, is performed about the central axis X (step S3). This rotation is of an angular value determined beforehand and dependent on the desired accuracy, on the application and on the dimensions of the device, so as to leave a desired minimum clearance and necessary for the operation of the mechanism in the field of thermal use concerned by the valve.

Once the desired positioning has been obtained, the rotation is stopped, and the bolted connections 60 are tightened so as to fix the connecting flange 20, and therefore the rack 30, in this position (step S4).

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Accordingly, the description and the drawings should be considered in an illustrative rather than restrictive sense.

It is also obvious that all the characteristics described with reference to a method can be transposed, alone or in combination, to a device, and conversely, all the characteristics described with reference to a device can be transposed, alone or in combination, to a method.

The invention claimed is:

1. A regulating valve with a rack and pinion transmission system for an aircraft or a spacecraft, comprising:

a valve body, a transmission shaft disposed at least partly in the valve body, movable in rotation about a first axis, and including a pinion, a rolling element disposed at least partly in the valve body, movable in translation along a second axis substantially perpendicular to the first axis, and including a rack, the rack being engaged with the pinion so that a rotation of the transmission shaft causes a translation of the rolling element, a first end of the rolling element being guided in translation by a first fixed bearing, and a second end of the rolling element being guided in translation by a second bearing, an annular connecting flange fixed to the valve body by means of fixing means, the annular connecting flange radially extending between an axisymmetric inner face about the second axis and an axisymmetric outer face about a central axis, the inner face comprising a radially inner housing in which the second bearing is housed, the second axis being radially offset with respect to the central axis.

2. The regulating valve according to claim 1, wherein the annular connecting flange is fixed to an annular flange of the valve body, the central axis of the outer face of the annular connecting flange and a central axis of the annular flange of the valve body being concentric, when the annular connecting flange is fixed to the annular flange of the valve body.

3. The regulating valve according to claim 2, wherein the annular flange of the valve body comprises, along its outer circumference, a centering shoulder, and the annular connecting flange comprises a circumferential shoulder having a shape complementary to the centering shoulder of the annular flange of the valve body, and being configured to interlock with said centering shoulder when the annular connecting flange is fixed to the annular flange of the valve body.

4. The regulating valve according to claim 3, wherein when the annular connecting flange is fixed to the annular flange of the valve body, the centering shoulder and the circumferential shoulder are axisymmetric about the central axis of the outer face of the annular connecting flange.

5. The regulating valve according to claim 2, wherein the annular connecting flange comprises oblong orifices circumferentially distributed about the central axis of the outer face of said flange, and configured to receive means for fixing the annular connecting flange to the annular flange of the valve body.

6. The regulating valve according to claim 1, wherein, along a radial direction perpendicular to the central axis of the outer face of the annular connecting flange, a distance between the central axis of said outer face and the second axis is less than 6 mm, preferably less than 4 mm, more preferably less than 2 mm.

7. The regulating valve according to claim 1, the valve being a cryogenic regulating valve.

8. An engine of an aircraft or a spacecraft comprising a regulating valve according to claim 1.

9. The engine of an aircraft or a spacecraft according to claim 8, the engine being a rocket engine.

10. A setting method using the regulating valve according to claim 1, comprising steps of:

rotating the annular connecting flange in the counter-clockwise direction about its central axis until bringing the rack into contact with the pinion, rotating the annular connecting flange in the clockwise direction about its central axis by a predetermined angular value, tightening the annular connecting flange against the annular flange of the valve body via the fixing means.

* * * * *